July 18, 1933.  I. WAKE  1,919,138
SELF LUBRICATING SWIVEL BEARING
Filed Nov. 12, 1929  2 Sheets-Sheet 1

I. Wake INVENTOR

By Marks & Clerk ATTys.

July 18, 1933.  I. WAKE  1,919,138

SELF LUBRICATING SWIVEL BEARING

Filed Nov. 12, 1929  2 Sheets-Sheet 2

Patented July 18, 1933

1,919,138

UNITED STATES PATENT OFFICE

ICHIRO WAKE, OF KOJIMACHI KU, TOKYO, JAPAN, ASSIGNOR TO GOSHIKWAISHA OHNO SEISAKUSHO, OF TOKYO, JAPAN, A CORPORATION OF JAPAN

SELF-LUBRICATING SWIVEL BEARING

Application filed November 12, 1929. Serial No. 406,689.

My invention relates to improvements in a self lubricating swivel bearing. The object of the invention is to provide a bearing of the type in which arced guide surfaces of a proper width are formed across the upper and lower sides of the bushing so as to form parts of a cylindrical surface having its axis horizontal and at right angles to the axis of the shaft, said guide surfaces being slidably supported by a pair of supporting members having concavely arced guide surfaces and rotatably supported in the casing on a vertical axis, whereby the bushing is supported to swivel in all directions. Another object of the invention is to provide a self lubricating means comprising flanges fixed on the sleeve of the shaft in such a manner that their lower parts dip into oil pots while the oil which adheres to said flanges is carried up by the rotation of the shaft and is swept by sweepers arranged at the upper part of the bushing to be continuously supplied into oil grooves whereby the shaft is automatically lubricated.

Another object of the invention is to provide lubricating means of the type in which a pair of said flanges, sweeper and oil groove are arranged to act in opposite directions at the upper part of the bushing and the oil grooves are arranged in communication with each other by an oil passage formed inside the bushing so that lubrication may be equally performed irrespective to the direction of rotation of the shaft. Further objects will appear in the course of the present specification.

The accompanying drawings show the self lubricating swivel bearing embodying the present invention.

According to the present invention arced guide surfaces of proper widths are formed across the upper and lower parts of the bushing so as to form parts of a cylindrical surface having its axis horizontal and at right angles to the axis of the shaft; said guide surfaces being slidably mounted on a pair of supporting members having concavely arced guide surfaces and rotatably supported on a vertical axis, so that the bushing is supported to swivel in all directions. The sleeve fixed on the shaft is provided with flanges the lower parts of which dip into the oil pot and by rotation of the shaft the oil adhering to said flanges is carried upwardly and is swept by sweepers arranged at the upper side of the bushing to be automatically supplied into oil grooves of the bushing. Said flanges, sweepers and oil grooves are arranged to act in opposite directions while the oil grooves communicate with each other by an oil passage so that lubrication may be effected irrespective of the direction of rotation of the shaft.

Figure 3:
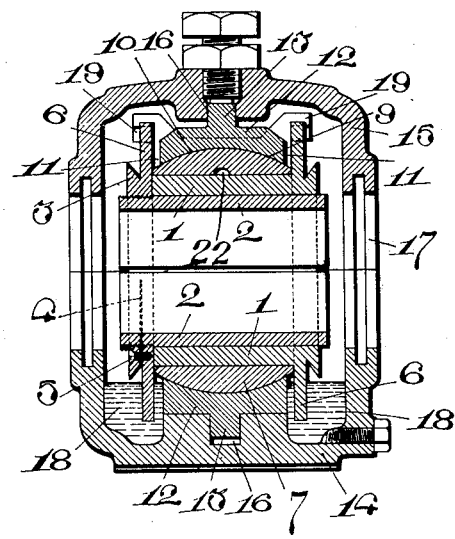
Fig. 3 is a longitudinal sectional side elevational view of the same.

Referring now more particularly to the drawings a sleeve (1) is fixed on the shaft (which for the sake of clearness is not shown in the drawings) by a pair of conical keys (2)(2), at one end of which a collar (3) is screwed in close contact with one end of the sleeve (1), as shown in Fig. 3. The collar (3) is partly split at (4), as shown, and tightened with a screw bolt (5) to prevent the collar (3) from loosening. The sleeve (1) and the collar (3) are provided with flanges (6)(6), and the sleeve (1) is rotatably mounted on the bushing (7) fitted between the collars (6)(6).

Figure 1:
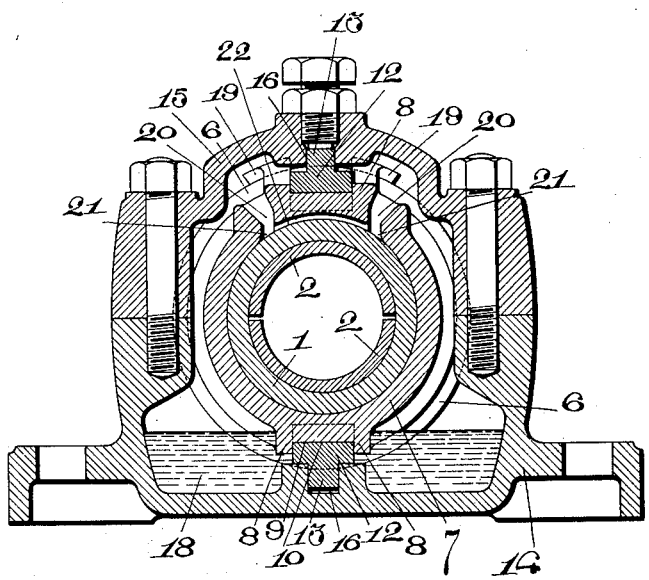
Fig. 1 is a cross sectional elevation of the improved bearing.
Figure 2:
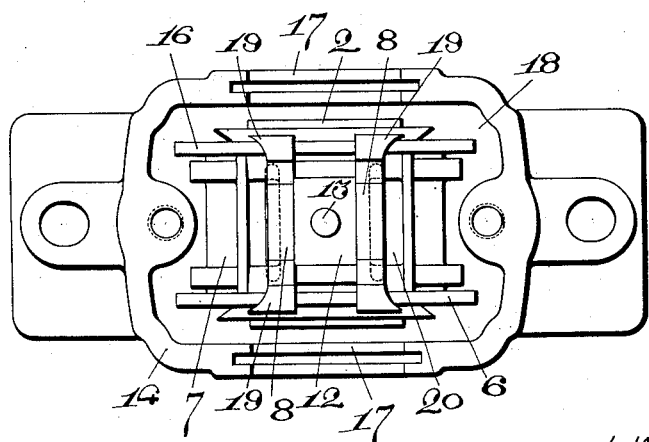
Fig. 2 is a plan view of same.
Figure 4:
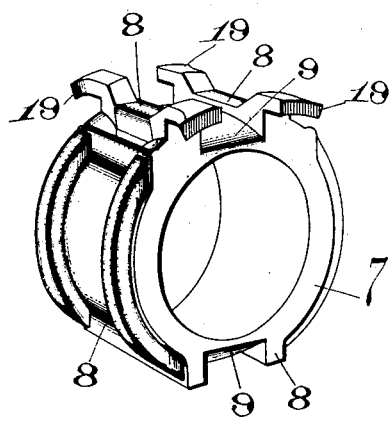
Fig. 4 is a perspective view of the bushing.
Figure 5:
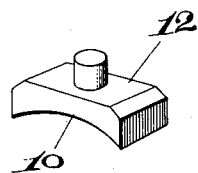
Fig. 5 is a perspective view of a supporting member.

The bushing (7) is substantially of a cylindrical form and is provided at its upper and lower sides with two pairs of projections (8)(8) respectively at a proper distance and parallel to the axis of the shaft, as shown in Figs. 1, 3 and 4. Between said projections (8)(8) are provided arced guide surfaces (9)(9), forming parts of a cylindrical surface with its axis horizontal and at right angles to the axis of the shaft. The bushing (7) is slidably mounted on supporting members (12)(12) having concavely arced guide surfaces (10)(10) closely fitted to said guide surfaces (9)(9), as shown in Figs. 1, 3 and 5. Both sides of the supporting members (12)(12) are kept in close contact with the projections (8) (8) as shown in Fig. 1, while at the edges of the supporting member are provided with clearances (11) (11) between the flanges (6) (6) of the sleeve (1) within the bound of said clearances the shaft may swing in a vertical plane, as shown in Fig. 3. The supporting members (12) (12) are provided with axles (13) (13) which are fitted into vertical recesses (16) (16) formed inside the casing (14) and cover (15) to be rotatably supported around a vertical axis. The casing (14) and the cover (15) are provided with circular openings (17) (17) for accommodating the shaft.

Thus the shaft may swing around the horizontal axis at right angles to the shaft by means of arced guide surfaces (9) (9) and (10) (10) within the bound of the clearances (11) (11), and may also swing around the vertical axis (13) (13) in a horizontal plane within the bound of clearances formed between the shaft and the openings (17) (17), and by a combination of said motions the shaft together with the bushing may swing in all directions.

The casing (14) is provided with oil pots (18) (18) and the lower parts of aforesaid flanges (6) (6) are adapted to be dipped therein. Sweepers (19) (19) are formed at both ends of said projections (8) (8), projecting outside nearly to the upper parts of the flanges (6) (6), as shown in Figs. 1 to 4. The oil adhering to the flanges (6) (6) is carried upward by rotation of the shaft and is swept off the flanges at the upper part by the sweepers (19) (19), which swept oil flowing along the curved sides of the sweeper is supplied into oil grooves (20) (20) formed at the upper part of the bushing, as shown in Fig. 1. The bottom ends (21) (21) of the oil grooves (20) (20) are inclined to form a sharp angle to the surface of the sleeve (1) for facilitating the entrance of oil between the bearing surfaces, as shown in Fig. 1. The oil grooves (20) (20) are arranged in communication with each other by an oil passage (22) formed inside the bushing (7).

When the shaft rotates in clock-wise direction in Fig. 1, the sleeve (1) and the flanges (6) (6) rotate together with the shaft. The oil adhering to the lower part of the flanges (6) in the oil pot (18) is carried upwardly and gathers at the periphery by the action of centrifugal force, and when passing by the sweeper (18) at the left side in Fig. 1, it is swept off the flange (6) and flows inwardly along the curved side of the sweeper (18) until it enters the oil groove (20) at the left side. The oil grooves at both sides being in communication with each other by the oil passage (22) and oil entering the left oil groove is carried into the right oil groove until the same level is obtained, while the oil which enters the right groove is automatically fed between the sleeve (1) and the bushing (7) from the inclined end (21) by the rotation of the shaft. When the shaft rotates in the reverse direction the sweeper at the right side and the oil groove at the left side act in the same manner so that the bearing is automatically lubricated in proportion to the speed of the shaft irrespective of the direction of rotation.

Having now particularly described and ascertained the nature of my said invention and in what manner the same is to be performed I declare that what I claim is:—

1. In a self-lubricating swivel bearing, swivel mounted means adapted to support a revoluble shaft therein, and permit the movement of the longitudinal axis of the shaft after the shaft is in mounted position, both in a horizontal direction around the vertical axis of the bearing and in a vertical direction around the transverse horizontal axis of the bearing, comprising an enclosing casing, a cylindrical sleeve rigidly mounted on the shaft, a pair of semi-cylindrical keys mounted on the shaft, means for locking the sleeve and cylindrical keys on the shaft, a bushing revolubly mounted on the sleeve having a pair of opposed arced surfaces on the periphery of same, and a pair of opposed supporting members pivotally mounted in the casing, each having a complementary arced surface in slidable engagement with the corresponding surface of the bushing.

2. In a self-lubricating swivel bearing for a shaft, an enclosing casing having an oil reservoir therein, a pair of opposed supporting members pivotally mounted in the casing to permit movement of the end of the shaft about the vertical axis of the bearing, a sliding arced surface formed in each supporting member, a bushing provided with a pair of parallel longitudinal oil-carrying grooves and a transverse connecting oil passage between said grooves, a pair of complementary arced surfaces on the bushing each in sliding engagement with one of the arced surfaces of the supporting members to permit movement of the end of the shaft about the transverse horizontal axis of the bearing, and a cylindrical sleeve rigidly mounted on the shaft and revolubly mounted in the bushing to provide the normal bearing surface for the revolution of the shaft; in combination with automatic lubricating means for the sleeve comprising a pair of parallel flanges associated with the sleeve and revolving therewith, for carrying oil from the oil reservoir by centrifugal motion to the oil-carrying grooves of the bushing.

3. In a self-lubricating swivel bearing, a cylindrical bushing having a pair of outstanding flanges on each end of said bushing, a pair of longitudinal and parallel projections on the top and bottom sides of the bushing, a pair of opposed and outwardly extending sweepers on each end of the upper longitudinal projections, and a pair of arced and diametrically opposed guide surfaces formed on the exterior of the bushing, each surface being co-extensive with the space between the longitudinal parallel projections.

4. In a self-lubricating swivel bearing, an enclosing casing, a cylindrical sleeve adapted to receive a revoluble shaft therein, an outstanding flange formed on one end of the sleeve, a pair of semi-cylindrical keys within the sleeve, a flanged collar mounted on the keys, a cylindrical bushing slidably mounted on the sleeve, having a pair of opposed arced surfaces formed thereon, a plurality of sweepers on the bushing in sweeping engagement with the sleeve and collar flanges, a pair of diametrically opposed supporting members pivotally mounted in the casing, each provided with a complementary arced recess which is in slidable engagement with one of the arced surfaces of the bushing, said supporting members and bushing being designed to permit a partial horizontal and vertical movement of the revoluble shaft after same is in position in the bearing.

5. In a self-lubricating swivel bearing, an enclosing casing, an oil reservoir therein, a swivel bearing means comprising a bushing having a pair of opposed arced guide surfaces thereon, a sleeve revolubly mounted in the bushing, a pair of pivotally mounted and opposed supporting members mounted in the casing, each having a complementary arced recess in slidable engagement with one of the arced surfaces of the bushing, and means carried on the sleeve for carrying oil from the oil reservoir to the outer surface of the sleeve for lubricating same.

6. In a self-lubricating swivel bearing, an enclosing casing, a cylindrical sleeve adapted to support a revoluble shaft, an outstanding flange on one end of the sleeve, a pair of semi-cylindrical keys within the sleeve, a flanged collar mounted on the keys, adjacent to the end of the sleeve, a split flange portion in the collar, tightening means for locking the collar on the semi-cylindrical keys and shaft, a cylindrical bushing slidably mounted on the sleeve, having a pair of peripheral opposed and arced surfaces formed thereon, a number of sweepers on the bushing in sweeping engagement with the sleeve and collar flanges, a pair of diametrically opposed supporting members pivotally mounted in the casing, each provided with a complementary arced recess which is in slidable engagement with one of the arced surfaces of the bushing, said supporting members and bushing being designed to permit a partial horizontal and vertical movement of the shaft when same is in mounted position in the bearing.

7. In a self-lubricating swivel bearing, an enclosing casing, a cylindrical sleeve adapted to receive a revoluble shaft therein, an outstanding flange on one end of the sleeve, a flanged collar in adjacent relation to the other end of the sleeve, means for securing said collar in position, a cylindrical bushing on the sleeve, having a pair of arced peripheral surfaces thereon, a pair of diametrically opposed supporting members pivotally mounted in the casing, each having a complementary recess in co-operative engagement with one of the arced surfaces of the bushing, said supporting members being in spaced relation with the collar and sleeve flanges, for the purpose of permitting movement of the revoluble shaft within the limits provided by the edges of the supporting members, and the said collar and sleeve flanges.

8. In a self-lubricating swivel bearing, an enclosing casing, a cylindrical sleeve adapted to be rigidly mounted on a revoluble shaft, a bushing having means for the normal revolution of the sleeve therein, and an arced surface on opposed sides of the bushing, a pair of pivotally mounted supporting members for the bushing mounted in the casing for permitting the movement of the shaft about a vertical axis of the bearing, said supporting members having complementary arced recesses in engagement with the arced bushing surfaces to permit movement of the shaft about the horizontal axis of the bearing.

9. In a self-lubricating swivel bearing, an enclosing casing having an oil reservoir therein, a cylindrical sleeve adapted to be rigidly mounted on a revoluble shaft, a bushing having means for the normal revolution of the sleeve therein, and provided with a pair of longitudinal oil-carrying grooves connected to each other by a transverse oil carrying passage, a pair of oppositely disposed arced surfaces formed in the bushing, a pair of pivoted supporting members for the bushing, mounted in the casing, provided with a pair of complementary recesses each in engagement with one of the arced bushing surfaces; and automatic lubricating means for the bearing comprising a flange on one end of the sleeve, a flanged collar in adjacent relation to the other end of the sleeve, said flanges being adapted to carry oil from the casing reservoir when the shaft revolves, and a plurality of sweepers on the ends of the bushing in engagement with the sleeve and collar flanges for delivering oil to the oil-carrying grooves and passages of the bushing and lubricating the contacting sleeve and bushing surfaces.

ICHIRO WAKE.